(12) United States Patent
Kobayashi et al.

(10) Patent No.: US 7,772,985 B2
(45) Date of Patent: Aug. 10, 2010

(54) DETECTION DEVICE FOR PASSENGERS

(75) Inventors: Masatoshi Kobayashi, Tokyo (JP); Takahiro Kawakami, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 1058 days.

(21) Appl. No.: 11/430,190

(22) Filed: May 9, 2006

(65) Prior Publication Data

US 2006/0265113 A1   Nov. 23, 2006

(30) Foreign Application Priority Data

May 10, 2005   (JP)   ............................. 2005-136859

(51) Int. Cl.
  *G08B 21/22* (2006.01)
  *B60R 21/015* (2006.01)
(52) U.S. Cl. .................... 340/667; 340/666; 701/45; 297/217.2
(58) Field of Classification Search ................. 180/273; 701/45; 280/735; 340/666, 667; 297/217.2
See application file for complete search history.

(56) References Cited

U.S. PATENT DOCUMENTS 7,032,968 B2 *  4/2006  Sakai et al. ............... 297/217.2

2002/0024257 A1 *  2/2002  Fujimoto et al. ........... 307/10.1
2003/0154805 A1 *  8/2003  Takafuji et al. ........ 73/862.391
2003/0168895 A1 *  9/2003  Sakai et al. ............. 297/216.12

FOREIGN PATENT DOCUMENTS

JP   2001-191830 A   7/2001
JP   2003-237535 A   8/2003

OTHER PUBLICATIONS

Fujimoto et al, Translation of JP2001-191830, Jul. 17, 2001, JPO.*

* cited by examiner

*Primary Examiner*—Khoi Tran
*Assistant Examiner*—Spencer Patton
(74) *Attorney, Agent, or Firm*—Foley & Lardner LLP

(57) ABSTRACT

A detection device for passengers includes a passenger judgment unit which has a specified load judgment unit and a stability judgment unit, and a plurality of load sensors disposed on supporting parts of a seat of a vehicle. The passenger judgment unit makes a judgment on a state of a passenger on the seat of the vehicle according to output values of the plurality of load sensors. If a summation of the output values of the plurality of the load sensors is judged to fall into a specified load range of a child-seat by the specified load judgment unit, the passenger judgment unit will make a judgment on whether the child-seat is attached to the seat or not according to a summation of detected output values of the plurality of the load sensors detected when the stability judgment unit judged that the output values of the plurality of the load sensors are in stable state.

10 Claims, 6 Drawing Sheets

DETECTION DEVICE FOR PASSENGERS

BACKGROUND OF THE INVENTION

1. Field of the Invention

The present invention relates to a detection device for passengers for judging a state of a passenger sitting on a seat of a vehicle, especially whether a child-seat is attached to the seat or not, according to output values of a plurality of load sensors.

2. Description of Related Art

Conventionally, as shown in FIG. 2, it is known a detection device for passengers which judges if a passenger sitting on a seat of a vehicle is an adult or a child or the seat is vacant, according to output values of load sensors 4A-4D disposed on supporting parts 3, . . . , 3 which support a seat 1.

Also, it is known detection devices for passengers which judge whether a child-seat 5 shown in FIG. 3 is attached to the seat 1 or not, and perform a control that does not deploy an airbag (not shown) to prevent the child-seat 5 from being impacted by a pressure of the airbag, when the child-seat 5 is attached (for reference, see Japan Patent Publication No. 2003-237535 and No. 2001-191830).

Further, all of the detection devices described in the two reference documents judge whether the child-seat 5 is attached or not according to a variation character of load detected after the child-seat 5 is attached.

However, when attaching the child-seat 5, a load such as a weight of the person who is attaching the child-seat 5, or a tightening force of a seat belt 6 (as shown in FIG. 3) for fastening the child-seat 5 and etc. may be applied to the child-seat 5 and detected by the plurality of the load sensors, therefore, erroneous judgments may be made according to the output values of the load sensors in the above-mentioned cases.

SUMMARY OF THE INVENTION

Thus, an object of the present invention is to provide a detection device for passengers that can judge whether a child-seat is attached or not, correctly.

To achieve the object mentioned above, according to one aspect of the present invention, a detection device for passengers comprises: a passenger judgment unit which makes a judgment on a state of a passenger on a seat of a vehicle and includes a specified load judgment unit and a stability judgment unit; and a plurality of load sensors disposed on supporting parts which support the seat of the vehicle. If a judgment is made that a summation of the output values of the plurality of the load sensors falls into a specified load range of a child-seat judged by the specified load judgment unit, the passenger judgment unit makes a judgment on whether the child-seat is attached to the seat or not according to a summation of detected output values of the plurality of the load sensors detected when the stability judgment unit judged that the output values of the plurality of the load sensors are in stable state.

The detection device for passengers can further comprise such as a memory unit, a comparison unit and etc. If the summation of the output values of the plurality of the load sensors is judged to fall into the specified load range of the child-seat, the summation and an output value of at least one of the plurality of the load sensors can be stored in the memory unit as initial values. And the comparison unit can be configured to detect the summation of the output values of the plurality of the load sensors and the output value of the at least one of the plurality of the load sensors when the stable state is judged by the stability judgment unit, and compare them with the initial values stored in the memory unit, respectively.

According to an aspect of the present invention, the detection device for passengers can be configured as that a summation of the output values of the plurality of the load sensors is stored as an initial value if the summation is judged to fall into the specified load range of the child-seat by the specified load judgment unit, and compared with a summation of detected output values of the plurality of the load sensors detected when the stable state is judged by the stability judgment unit, and if a variation between them is not more than a predetermined value, the judgment on whether the child-seat is attached or not will not be made.

With such configurations of the present invention, only when the summation of the output values of the plurality of the load sensors falls into a specified load range of the child-seat, the judgment on whether the child-seat is attached or not is to be made.

And then, a variation of an output value of at least one of the plurality of the sensors, which changed markedly due to the attachment of the child-seat, and a variation of the summation of the output values of the plurality of the load sensors will be focused on and the judgment will be made again.

According to the present invention, as the judgment on whether the child-seat is attached to the seat or not is not to be made in the case that an adult with light weight sitting on the seat, therefore, erroneous judgment can be avoided and accurate judgment can be made.

The present application claims the benefit of priority to Japan Patent Application No. JP 2005-136859 filed on May 10, 2005, which is hereby incorporated by reference.

BRIEF DESCRIPTION OF THE DRAWINGS

For a better understanding of the invention, reference is made to the attached drawings, wherein:

FIG. 4 is a figure showing output values of the load sensors when a seat position is at the backmost position of a vehicle.

FIG. 5 is a figure showing the output values of the load sensors when the seat position is at the most front position of the vehicle.

DETAILED DESCRIPTION OF THE PREFERRED EMBODIMENTS

Preferred embodiments of the present invention will be explained below by referring to the accompanying drawings. It should be noted that in this specification, the same reference numbers are attached to the similar parts in the prior arts and the present invention, to make the explanation briefly.

Figure 1:
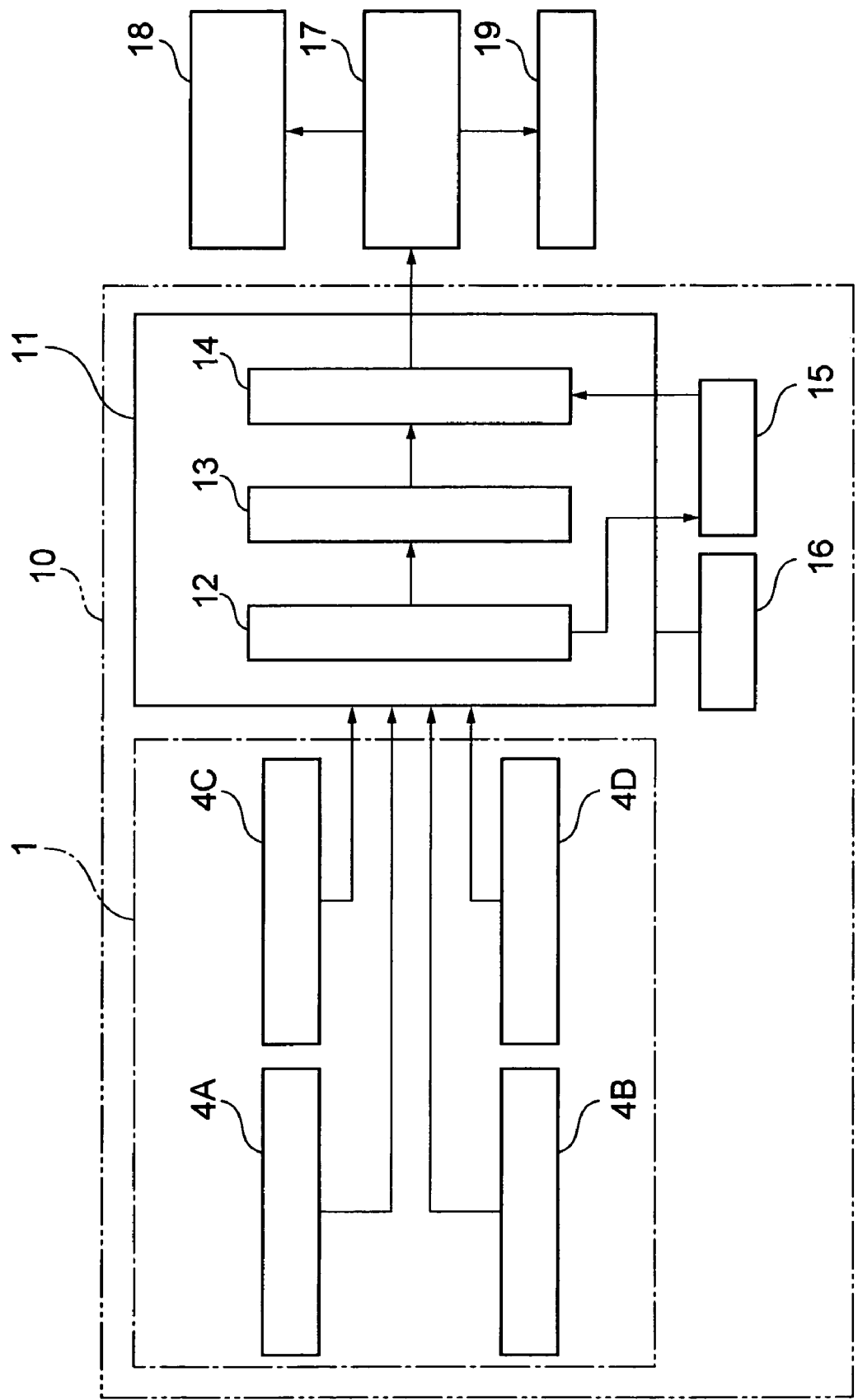
FIG. 1 is a block diagram showing a structure of a detection device for passengers of a preferred embodiment according to the present invention.
Figure 2:
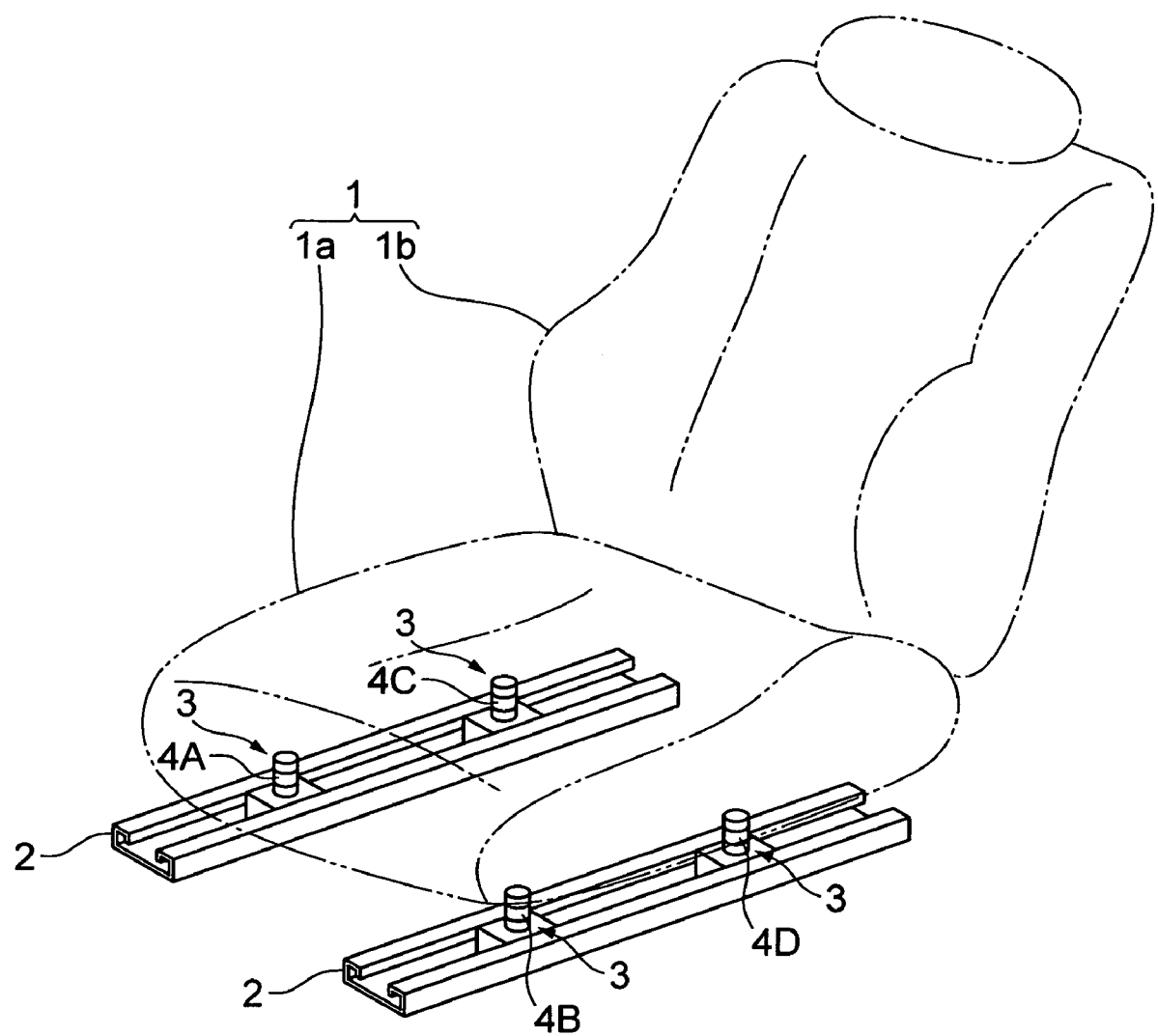
FIG. 2 is a perspective view showing a positional relationship of a seat and load sensors.
Figure 3:
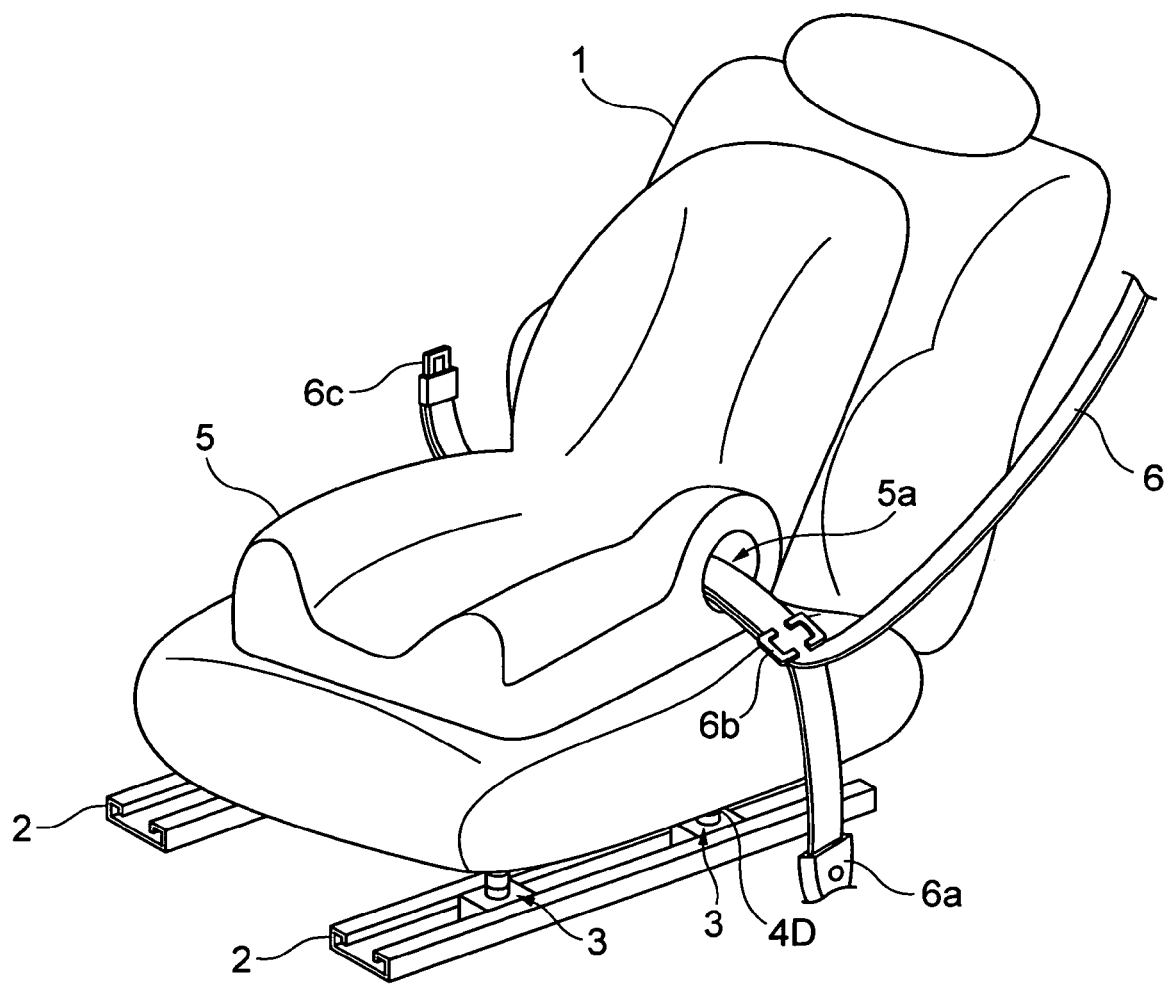
FIG. 3 is a perspective view showing a state that a child-seat being placed on the seat.

A detection device for passengers 10 of an embodiment according to the present invention, as shown in FIG. 1, makes a judgment on whether a child-seat 5 shown in FIG. 3 is attached to a seat 1 shown in FIG. 2 or not.

The seat 1 comprises seat cushion portion 1a and seat back portion 1b, and is mounted on seat rails 2,2 movably through supporting parts 3, . . . ,3, as shown in FIG. 2. The seat rails 2,2 are fixed on a floor inside the vehicle in parallel.

A front inner-side sensor 4A, a front outer-side sensor 4B, a rear inner-side sensor 4C, and a rear outer-side sensor 4D, as load sensors, are attached to the supporting parts 3, . . . ,3 at four places located at inner and outer sides in the lateral direction of the vehicle, at front and rear portions of the seat 1 respectively.

Furthermore, the supporting parts 3, . . . ,3 are formed to be moved slidably along the seat rails 2,2. Loads of a passenger or the child-seat 5 and the seat 1 transmitted from the seat 1 to the supporting parts 3, . . . ,3 are transmitted to the seat rails 2,2 through the supporting parts 3, . . . ,3.

In the embodiment of the present invention, distortion type load sensors are employed as the load sensors 4A-4D. Output values $W_A$-$W_D$ proportional to the distortions resulting from loads applied to the supporting parts 3, . . . ,3 are outputted.

The child-seat 5 to be attached to the seat 1, as shown in FIG. 3, is provided with an insertion hole 5a near the boundary of a seat and a backrest of the seat 1, penetrating in the lateral direction of the vehicle. The child-seat 5 is attached to the seat 1 by the seat belt 6 penetrated through the insertion hole 5a.

The attachment method is described in detail as follows. First, pulling a tongue plate 6c (to be fitted with a buckle, not shown) of the seat belt 6 slowly and drawing out the seat belt 6 from an upside of a center pillar (not shown).

And then folding the seat belt 6 in half, with the tongue plate 6c as a top, and attaching a locking plate 6b at the root of the folded seat belt.

After that, inserting the tongue plate 6c into the insertion hole 5a of the child-seat 5 and drawing it out from the inner side in the lateral direction of the vehicle and fitting it with the buckle (not shown). In this state, the child-seat 5 is only placed on the seat 1 but not fastened, so that only a weight of the child-seat 5 is added as load.

And then drawing up the seat belt 6 by pressing the child-seat 5 to the seat 1 with hands or knees, in the state that the tongue plate 6c is fitting with the buckle, as a result, the lower part of the folded seat belt 6 which folded in half between the tongue plate 6c and a locking part 6a being tightened, and the child-seat 5 being pressed to the seat cushion part 1a and being fastened.

In this state, a tightening force is added as load together with the weight of the child-seat 5. Especially, an output value of the rear outer-side sensor 4D near the locking part 6a increased significantly.

The detection device for passengers 10 in this embodiment, as shown in FIG. 1, comprises: load sensors (front inner-side sensor 4A, front outer-side sensor 4B, rear inner-side sensor 4C, rear outer-side sensor 4D); a passenger judgment unit 11 which judges a passenger state on the seat 1 including whether the child-seat 5 is attached or not according to the output values of the plurality of the load sensors; a memory unit 15 such as RAM or the like which stores a summation $W_S(0)$ of the output values and an output value $W_D(0)$ of the rear outer-side sensor 4D as initial values, when the summation $W_S$ of the output values $W_A$-$W_D$ of the load sensors 4A-4D is judged to be satisfied with a predetermined condition by a specified load judgment unit 12; a stability judgment unit 13 which judges if the output values of the load sensors 4A-4D are in stable state; a comparison unit 14 which detects a summation $W_S(n)$ of the output values $W_A$-$W_D$ of the load sensors 4A-4D and an output value $W_D(n)$ of the rear outer-side sensor 4D and compare them with the initial values $W_S(0)$ and $W_D(0)$ stored in the memory unit 15 respectively, when the stable state is judged by the stability judgment unit 13; and EEPROM 16 in which various threshold values are stored for each judgment. In this embodiment, the passenger judgment unit 11 is structured by including the specified load judgment unit 12, the stability judgment unit 13 and the comparison unit 14.

The weight of the child-seat 5, which is to be detected whether it is attached or not by the detection device of the passengers 10, is different based on the products. For example, according to American Regulations FMVSS208, the weight of the child-seat 5 should be in the range of 2.58-8.48 kg, therefore, for example, it is possible to select a range of 2.0-9.0 kg as a specified load range.

And then, whether the summation $W_S$ of the output values of the load sensors 4A-4D falls into the range of the specified load range or not is judged by the specified load judgment unit 12, and if it is within the range of the specified load range, the process will be shifted to the next step, as there is a possibility that the child-seat 5 is attached.

Moreover, when attaching the child-seat 5 or after attaching it, to fasten the child-seat 5 to the seat 1 steadily, the child-seat 5 may be pressed by hands or legs, or the seat belt 6 may be drawn up more than necessary and be fastened strongly, or the seat belt 6 may be tightened up after being fastened, therefore, a substantially increase and decrease of the output values $W_A$-$W_D$ of the load sensors 4A-4D may be occur during a short time.

Therefore, the judgment on whether the child-seat 5 is attached or not can not be made correctly according to the output values $W_A$-$W_D$ of the load sensors 4A-4D when attaching the child-seat 5 or right after attaching. So the judgment will be delayed until the output values $W_A$-$W_D$ of the load sensors 4A-4D are stabilized.

Whether the output values of the load sensors 4A-4D are stabilized or not will be judged by the stability judgment unit 13. A range that may be employed to judge the output values are in stable state is stored in the EEPROM 16 as an allowance range preliminarily, for example, and if the output values $W_A$-$W_D$ of the load sensors 4A-4D are confirmed to fall into the allowance range for a certain time, the output values are judged to be stabilized.

And then, in the comparison unit 14, focusing on a load variation of the child-seat 5 before and after it is fastened by the seat belt 6, making the judgment on whether the child-seat 5 is attached or not.

In FIGS. 4 and 5, (a) shows the output values $W_A$-$W_D$ and $W_S$ of the load sensors 4A-AD in the state that the child-seat 5 is placed on the seat 1 (before fastening), and (b) shows the output values $W_A$-$W_D$ and $W_S$ of the load sensors 4A-AD in the state that the child-seat 5 being fastened by the seat belt 6 (after fastening).

Figure 4A:
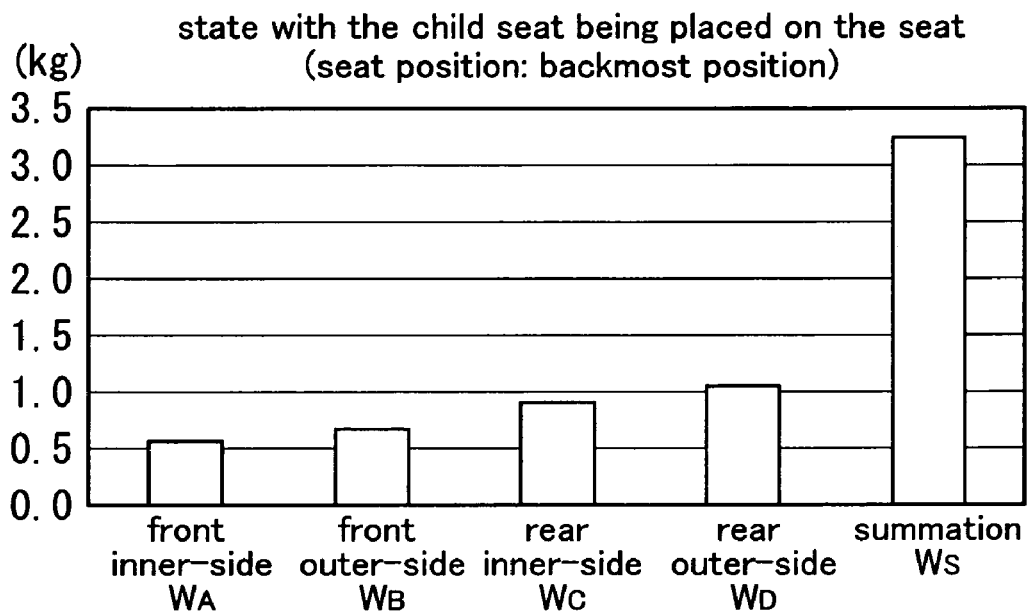
FIG. 4(a) shows the output values before the child-seat being fastened by a seat belt and FIG. 4(b) shows the output values after the child-seat being fastened by the seat belt.
Figure 4B:
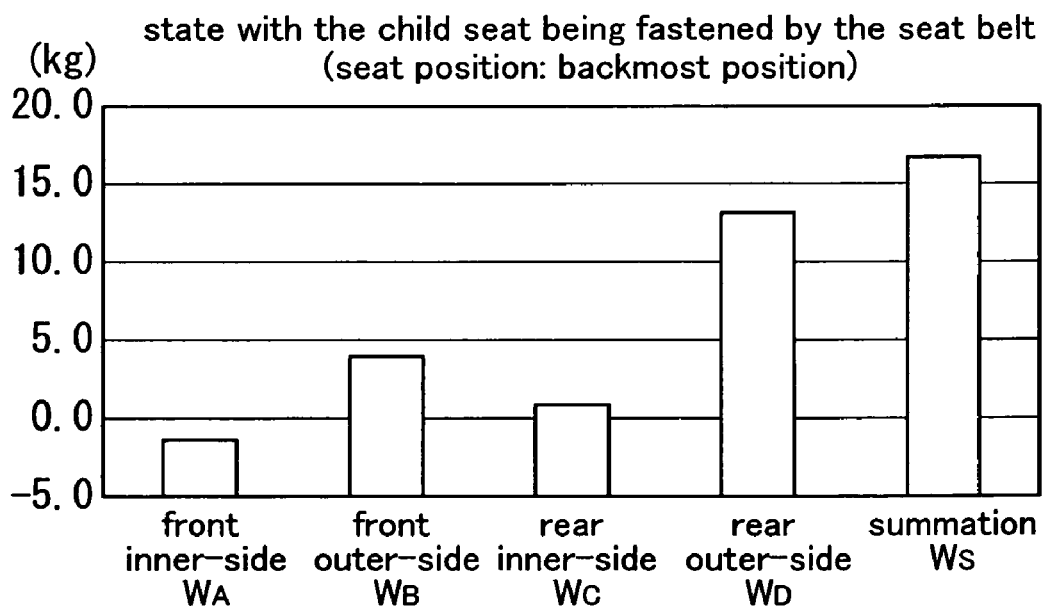

Further, FIG. 4(a) shows the output values $W_A$-$W_D$ of the load sensors 4A-4D, and the summation $W_S$ of them, in the case that the seat 1 is slid to the rear end of the vehicle and adjusted to the backmost position, before fastening; FIG. 4(b) shows the output values $W_A$-$W_D$ and the summation $W_S$ of them, in the case that the seat 1 has been fastened. Here, the longitudinal axis in FIG. 4(a) is set to be the range of 0.0-3.5 kg, while in FIG. 4(b) the longitudinal axis is set to be the range of −5.0-20.0 kg.

Comparing the two figures, it can be understood that the output value $W_D$(=1.1 kg) of the rear outer-side sensor 4D before fastening the child-seat 5 is nearly the same level with the other output values, while the output value $W_D$(=13.0 kg)

increased significantly after fastening the child-seat 5, comparing with the other output values, and although the increment of $W_D$(13.0−1.1=11.9 kg) is smaller than that of the summation $W_S$(17.0−3.3=13.7 kg), it is a big value that approximately the same level with the increment of the summation $W_S$.

Moreover, the output value $W_B$ of the front outer-side sensor 4B increased as well, it proved that the child-seat 5 is pressed to the outer side in the vehicle due to fasten the seat belt 6.

FIG. 5 shows the output values $W_A$-$W_D$ of the load sensors 4A-4D, and the summation $W_S$ of them, in the case that the seat 1 is slid to the front end of the vehicle and adjusted to the most front position.

Figure 5A:
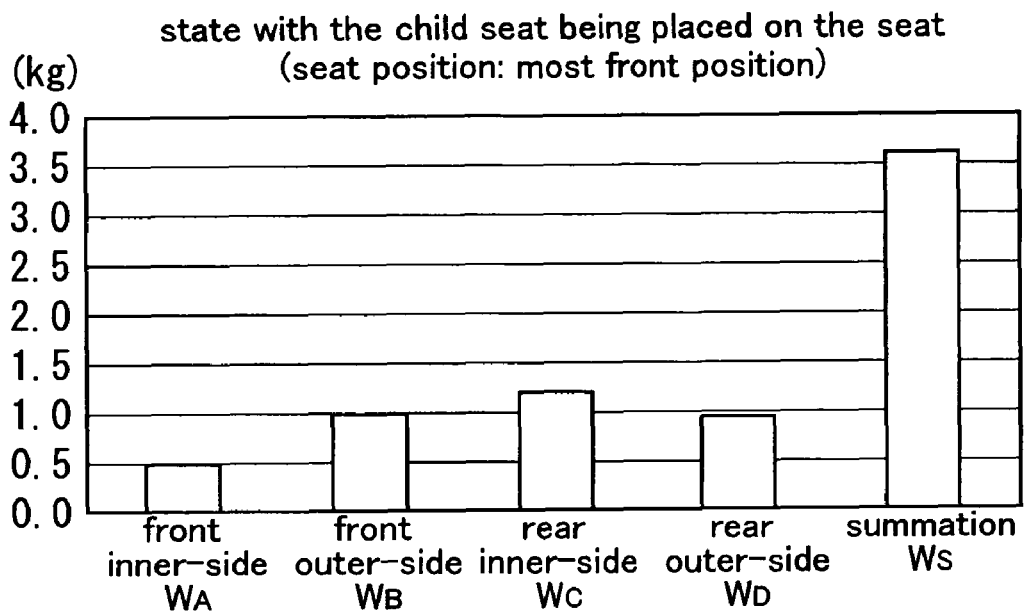
FIG. 5(a) shows the output values before the child-seat being fastened by the seat belt and FIG. 5(b) shows the output values after the child-seat being fastened by the seat belt.
Figure 5B:
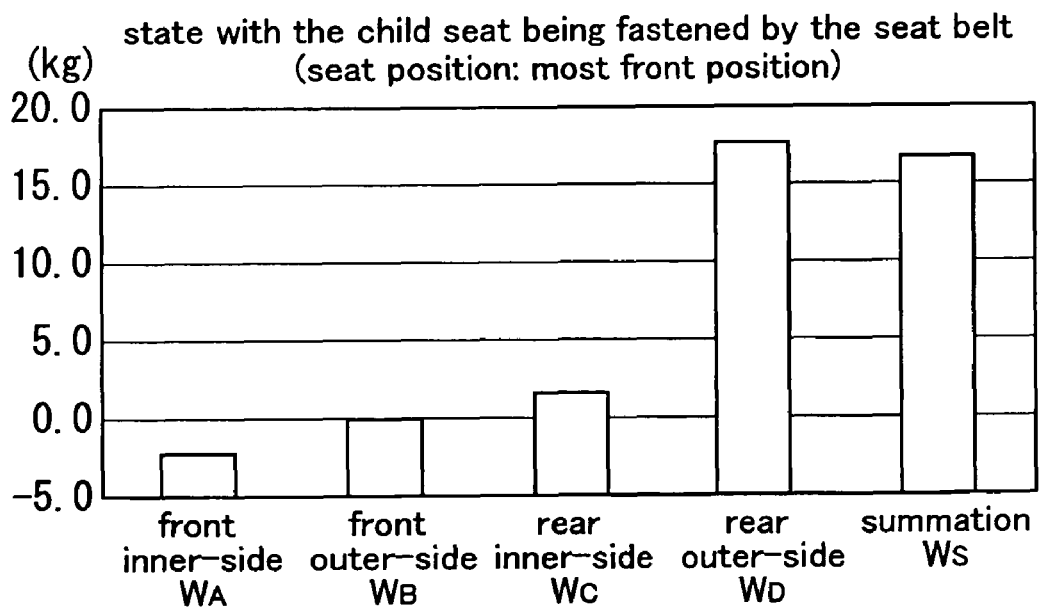

Comparing the two figures, it can be understood that as shown in FIG. 5(a), the output value $W_D$(=0.9 kg) of the rear outer-side sensor 4D before the child-seat 5 being fastened is nearly the same level with the other output values, while as shown in FIG. 5(b), the output value $W_D$(=17.5 kg) increased significantly after the child-seat 5 being fastened, and the increment of $W_D$(17.5−0.9=16.6 kg) is greater than that of the summation $W_S$(17.0−3.6=13.4 kg).

That is because that due to fasten the seat belt 6, the child-seat 5 leans to the rear outer side in the vehicle, and the part near the front inner-side sensor 4A located at the diagonal line of the rear outer-side sensor 4D floats upwardly, so that the output value $W_A$ becomes a negative value, and as a result the summation $W_S$ becomes smaller than the output value $W_D$ of the rear outer-side sensor 4D.

Like this, for the load variation of the child-seat 5 before and after it is being fastened by the seat belt 6, no matter the seat 1 is set at the backmost position nor at the most front position, the increment of the output value $W_D$ of the rear outer-side sensor 4D is the same level with or greater than that of the summation $W_S$ of the output values $W_A$-$W_D$ of the load sensors 4A-4D, i.e. the tendency of the output values when the child-seat 5 is attached is not changed no matter where the seat 1 is set.

When the child-seat 5 is judged that has been attached by the passenger judgment unit 11, a signal is transmitted to an airbag control unit 17, and the deployment of an airbag 19 will be stopped, and a passenger-state indicating lamp 18 will be lighted to inform the passengers that the child-seat 5 is judged that has been attached.

Figure 6:
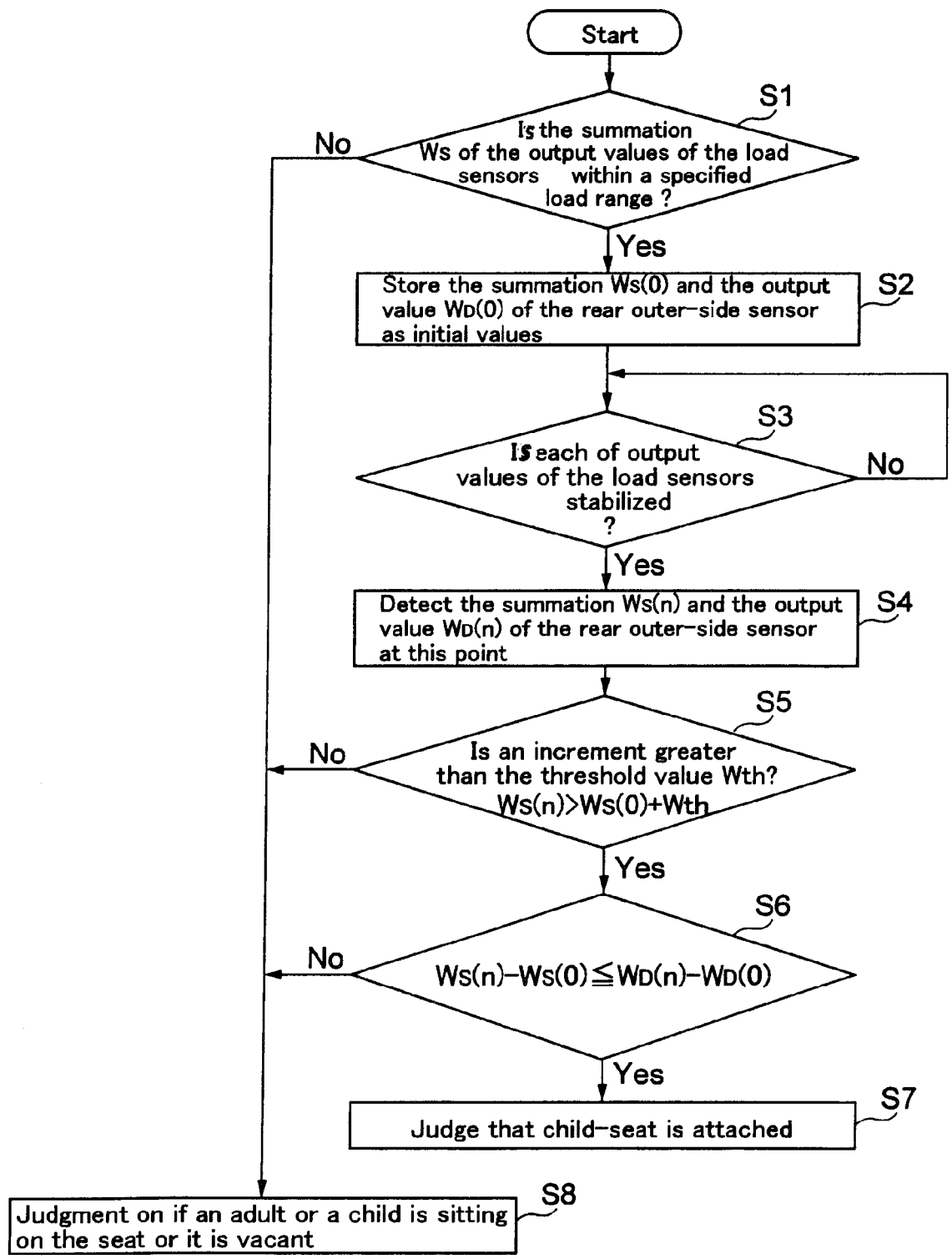
FIG. 6 is a flowchart showing processing flow of the detection device for passengers.

Next, the function of the detection device of the passengers 10 mentioned above will be explained, with reference to the flowchart shown in FIG. 6.

After a door-open signal generated when a passenger opened the door (not shown) of the vehicle, or a buckle-on signal generated when the tongue plate 6c of the seat belt 6 is inserted into the buckle (not shown) is detected, the detection of the output values $W_A$-$W_D$ of the load sensors 4A-4D will begin.

During attaching the child-seat 5, the tongue plate 6c will be inserted into the buckle after placing the child-seat 5 on the seat 1 and penetrating the seat belt 6 through the insertion hole 5a, so that the weight of the child-seat 5 can be detected at this point.

On the contrary, in the case that an adult sitting on the seat 1 and inserted the tongue plate 6c into the buckle, a greater load more than the weight of the child-seat 5 will be detected at the beginning.

And so, at step S1, if the summation $W_S$ of the output values $W_A$-$W_D$ of the load sensors 4A-4D is within the specified load range (for example 2.0-9.0 kg) of the child-seat 5, the output values at that point will be stored in the memory unit 15 as initial values (the summation $W_S$(0), the output value $W_D$(0) of the rear outer-side sensor) (S2), as there is a possibility that the child-seat 5 is placed on.

Moreover, in the case of attaching the child-seat 5, during fastening the seat belt 6, the output values $W_A$-$W_D$ of the load sensors 4A-4D will change frequently, so that if the output values $W_A$-$W_D$ are confirmed to fall into the allowance range being stored in EEPROM 16 for a certain time, the output values $W_A$-$W_D$ are stabilized (S3), and the summation $W_S$(n) of each of the output values $W_A$-$W_D$ and the output value $W_D$(n) of the rear outer-side sensor 4D at this point(n) will be detected (S4).

And then, a sum of the summation $W_S$(0) stored in the memory unit 15 and the threshold value $W_{th}$ being stored preliminarily in EEPROM 16 will be compared with the summation $W_S$(n), if the summation $W_S$(n) is greater, it will be regarded as that the tightening force has been applied to the child-seat 5 and the process will be proceeded to the next step (S5).

Additionally, at Step 6, the increment of the summation ($W_S$(n)-$W_S$(0)) will be compared with the increment of the output value of the rear outer-side sensor 4D($W_D$(n)-$W_D$(0)), if the increment of the output value of the rear outer-side sensor 4D is the same level with or more than the increment of the summation, it will be regarded as that the child-seat 5 is attached (S7); and if it is other than that, it will be regarded as that the child-seat 5 is not attached, and if an adult is sitting on the seat 1, or a child is sitting on the seat 1, or the seat 1 is vacant will be judged at Step 8.

In the embodiment described above, only when the summation $W_S$ of the output values $W_A$-$W_D$ of the load sensors 4A-4D falls into the specified load range of the child-seat 5, the judgment on whether the child-seat 5 is attached or not will be made. Therefore, the possibility of erroneous judgments may be reduced.

Moreover, since the relationships between the output value $W_D$ of the rear outer-side sensor 4D which changed significantly due to the attachment of the child-seat 5, and the variation of the summation $W_S$ of the output values $W_A$-$W_D$ of the load sensors 4A-4D are specialized and focused on, it is possible to make the judgments correctly with fewer processes.

Furthermore, such as in the case that an adult with light weight sitting on one side of the seat 1 near to the outer side in the vehicle, or placing one's arm on the seat 1 or the like, i.e. even in the case that it may be easy to make an erroneous judgment when the judgment is made only according to the load variation, since a condition that the summation $W_S$ of the output values $W_A$-$W_D$ of the load sensors 4A-4D should fall into the specified load range is added to the judgment conditions, the probability of erroneous judgments will be extremely low, no matter at what kind of usage state.

As shown in FIGS. 4 and 5, the relationships between the output value $W_D$ of the rear outer-side sensor 4D and the summation $W_S$ of the output values $W_A$-$W_D$ of the load sensors 4A-4D are different depending on the positions of the seat 1, so that the positions of the seat 1 can be estimated according to the output value $W_D$ and the summation $W_S$ of the output values $W_A$-$W_D$.

The best mode embodiment of the present invention has been described in detail as above, with reference to the drawings. It will be understood that the configurations in detail are not limited to the best mode embodiment, and various modifications made in design without departing from the spirit and scope of the invention fall into the range of the present invention.

For example, in the embodiment above-mentioned, the judgment on whether they are stabilized or not is made according to the actual output values $W_A$-$W_D$ of the load sensors 4A-4D by the stability judgment unit 13, however, it is not limited to so, it is possible to configure as that the stability judgment unit 13 includes a timer, and makes the elapsed time as a judgment reference with an assumption that the output values of the load sensors 4A-4D are to be stabilized after a predetermined time passed from the point when the initial values are stored in the memory unit 15.

Moreover, in the embodiment described above, the load sensors 4A-4D are disposed at four places, but it is not limited to so, if only that at least one load sensor such as the rear outer-side sensor 4D is disposed at the place where the greatest load will be applied when the child-seat 5 is attached, the numbers and the positions of the other load sensors can be set randomly.

Furthermore, in the embodiment described above, the distortion type load sensors are employed as the load sensors 4A-4D, but it is not limited to such a case, for example, the hydraulic type load sensor may be employed as well.

What is claimed is:

1. A detection device for passengers, comprising:
a passenger judgment unit which makes a judgment on a state of a passenger on a seat of a vehicle and includes a specified load judgment unit and a stability judgment unit;
a plurality of load sensors disposed on supporting parts which support the seat of the vehicle;
wherein if a judgment is made that a summation of output values of the plurality of load sensors falls into a specified load range of a child-seat judged by the specified load judgment unit, an output value of at least one of the plurality of load sensors is stored as a first initial value, and the summation of the output values of the plurality of load sensors is stored as a second initial value, and the first initial value and the second initial value are compared with a detected output value of the at least one of the plurality of load sensors and a summation of detected output values of the plurality of load sensors detected when a stable state is judged by the stability judgment unit, respectively, and if a first increment between the detected output value of the at least one of the plurality of load sensors at the stable state and the first initial value is equal to or more than a second increment between the summation of the detected output values of the plurality of load sensors at the stable state and the second initial value, the passenger judgment unit judges that the child-seat is attached to the seat of the vehicle.

2. The detection device for passengers according to claim 1,
wherein if the second increment between the second initial value and the summation of detected output values of the plurality of load sensors detected when the stable state is judged by the stability judgment unit is not more than a predetermined value, a judgment on whether the child-seat is attached or not will not be made.

3. The detection device for passengers according to claim 1,
wherein a position of the seat attached with the child-seat is estimated according to a variation between an output value of the at least one of the plurality of load sensors detected when the child-seat is placed on the seat, and an output value of the at least one of the plurality of load sensors detected when the child-seat is fastened to the seat by a seat belt, and a variation between a summation of the output values of the plurality of load sensors detected when the child-seat is placed on the seat, and a summation of output values of the plurality of load sensors detected when the child-seat is fastened to the seat by the seat belt.

4. The detection device for passengers according to claim 1, wherein the specified load range is set based on a weight of the child-seat.

5. The detection device for passengers according to claim 1, wherein the at least one of the plurality of load sensors is a sensor disposed at a rear portion of the seat and on an outer side in a lateral direction of the vehicle.

6. A method of detecting if a child-seat is attached to a seat of a vehicle, comprising:
receiving output values respectively provided by a plurality of load sensors;
determining whether a summation of output values of the plurality of load sensors falls into a specified load range of a child-seat;
when the determining step determines that the summation of output values of the plurality of load sensors falls into the specified load range, storing one of the output values provided by one of the plurality of load sensors as a first initial value, and storing the summation of the output values provided by the plurality of load sensors as a second initial value;
determining when a stable state of output values of the plurality of load sensors occurs;
storing one of the output values provided by one of the plurality of load sensors when the stable state is determined to occur as a first stable value;
storing a summation of the output values provided by the plurality of load sensors when the stable state is determined to occur as a second stable value;
comparing the first initial value with the first stable value, and comparing the second initial value with the second stable value; and
when a first increment between the first stable value and the first initial value is equal to or more than a second increment between the second stable value and the second initial value, making a judgment that the child-seat is attached to the seat of the vehicle.

7. The method according to claim 6, further comprising:
determining whether the second increment between the second initial value and the summation of detected output values of the plurality of load sensors detected when the stable state is judged is not more than a predetermined value, and if so, not performing a judgment on whether the child-seat is attached or not.

8. The method according to claim 6, further comprising:
estimating a position of the seat attached with the child-seat according to a variation between an output value of the at least one of the plurality of load sensors detected when the child-seat is placed on the seat, and an output value of the at least one of the plurality of load sensors detected when the child-seat is fastened to the seat by a seat belt, and a variation between a summation of the output values of the plurality of load sensors detected when the child-seat is placed on the seat, and a summation of output values of the plurality of load sensors detected when the child-seat is fastened to the seat by the seat belt.

9. The method according to claim 6, wherein the specified load range is set based on a weight of the child-seat.

10. The method according to claim 6, further comprising:
disposing the at least one of the plurality of load sensors at a rear portion of the seat and on an outer side in a lateral direction of the vehicle.

* * * * *